3,203,709
SAFETY CRASH TRAY FOR VEHICLES
Peter Presunka, Cardinal Heights, Ontario, and James F. Liston, Ottawa, Ontario, Canada, assignors of one-third to Steve Presunka, Cardinal Heights, Ontario, Canada
Filed Mar. 12, 1962, Ser. No. 178,858
14 Claims. (Cl. 280—150)

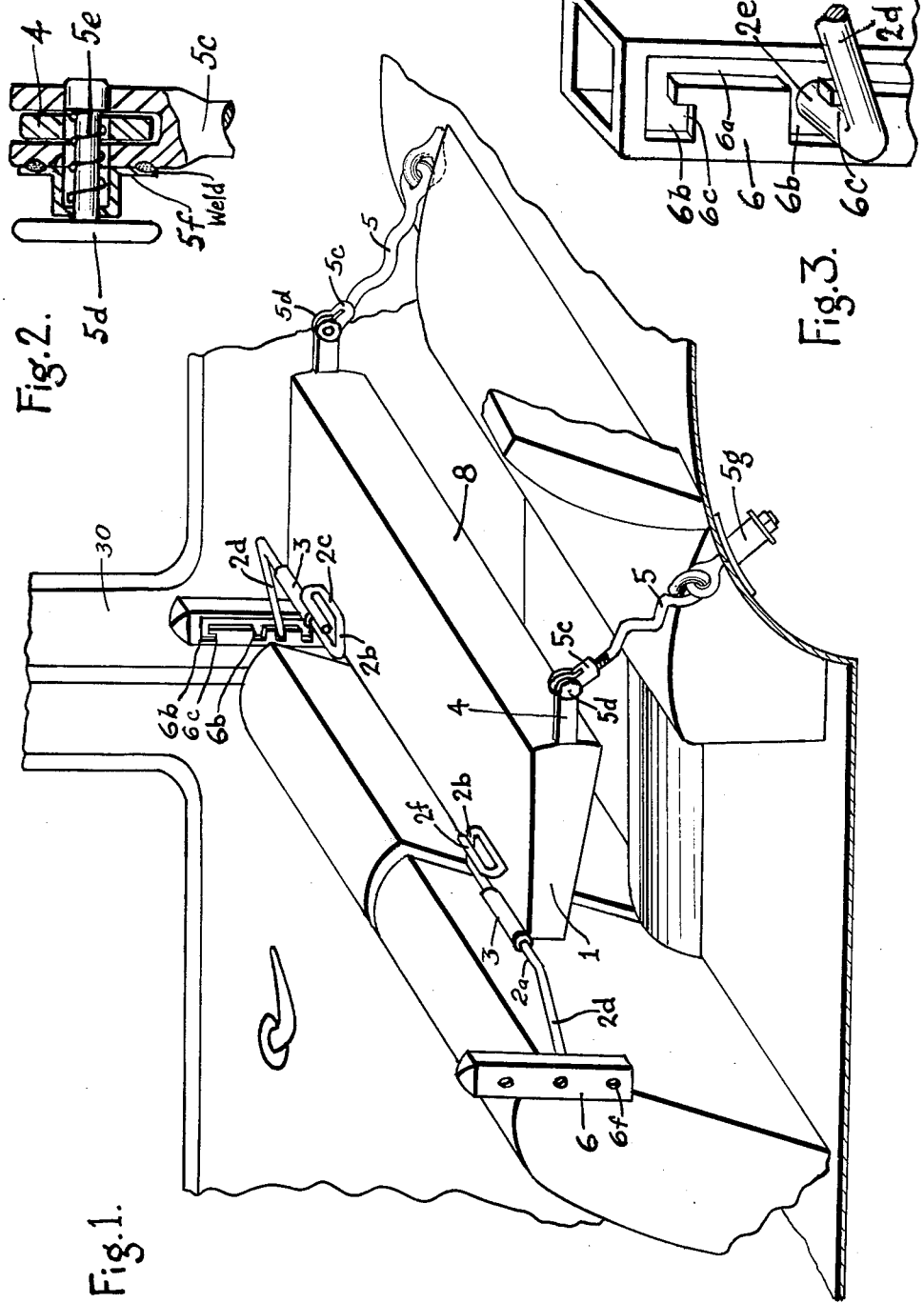

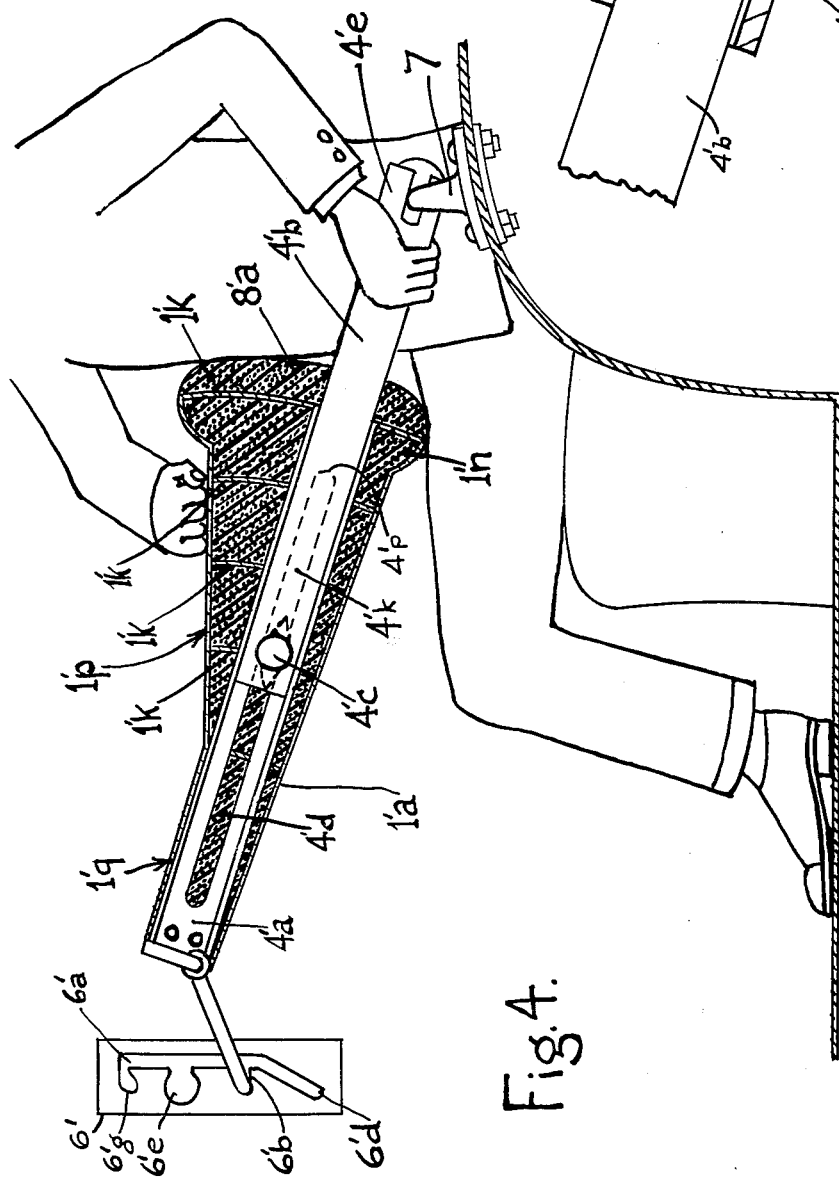

This invention comprises a duel purpose accessory for vehicles, combining the functions of a car tray and a crash bar, and by virtue of the design of its mounting means also serving to keep passengers from being thrown out of a vehicle even when the doors are sprung open in an accident. Both the tray and its mounting means are designed to collapse progressively without rebound, thereby absorbing the energy of deceleration without "kicking back" due to stored energy.

The mounting means of the tray are also designed to permit the tray to be partially detached and placed in a stored position in which it will be out of the way. In the rear seat variant, it is lowered to a position which allows passengers to enter and leave the rear seat of a two-door sedan merely by stepping over the stored tray. In a front seat variant, the tray is stored under the dash. In both variants, the front of the tray, referring to "front" and "rear" as mounted in the vehicle, is pivoted on mounts which are slidable in tracks which guide it to and from its stored position, and the rear of the tray is readily attachable to and detachable from one or more rigid links attached to points in the vehicle to the rear and below the tray. When the tray is stored, the struts drop to the floor of the car or rest against other vehicle structures out of the way, but handy for use.

The construction of the tray mounting means is a further novel feature of the invention, in that it is designed to serve a dual purpose. During normal conditions of use it acts as a substantially rigid supporting means for the tray and permits the tray to be readily placed out of the way into storage; however, under severe impact conditions, as in a vehicle crash, the front and rear tray mounting means coact with associated vehicle attachments and with each other in such a way as to yield to a predetermined extent so as to absorb impact energy during peak impact forces transmitted to the rear tray edge by the passengers using it.

In the drawings illustrating variants of the invention:

FIG. 1 shows the complete invention installed in a two door car, with one variant of extensible rear mounts.

FIG. 2 shows one variant of a clevis connection.

FIG. 3 shows a part of the right hand side of front mounting on an enlarged scale.

FIG. 4 shows a preferred variant of a collapsible tray in section, juxtaposed behind, with another variant of rigid rear load resisting links, in its normal position of use, FIG. 5 shows a section through the attachment of one of the rear links of FIG. 4.

Figure 6:
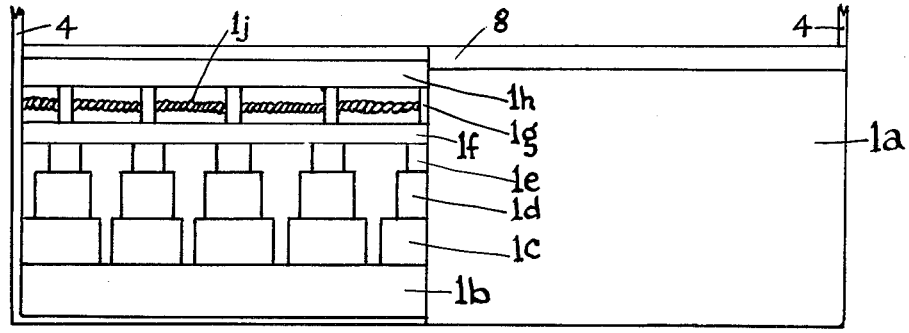
FIG. 6 is a partly sectioned plan view of a collapsible tray of the type shown mounted in FIG. 1, which uses crushable blocks in it.
Figure 9:
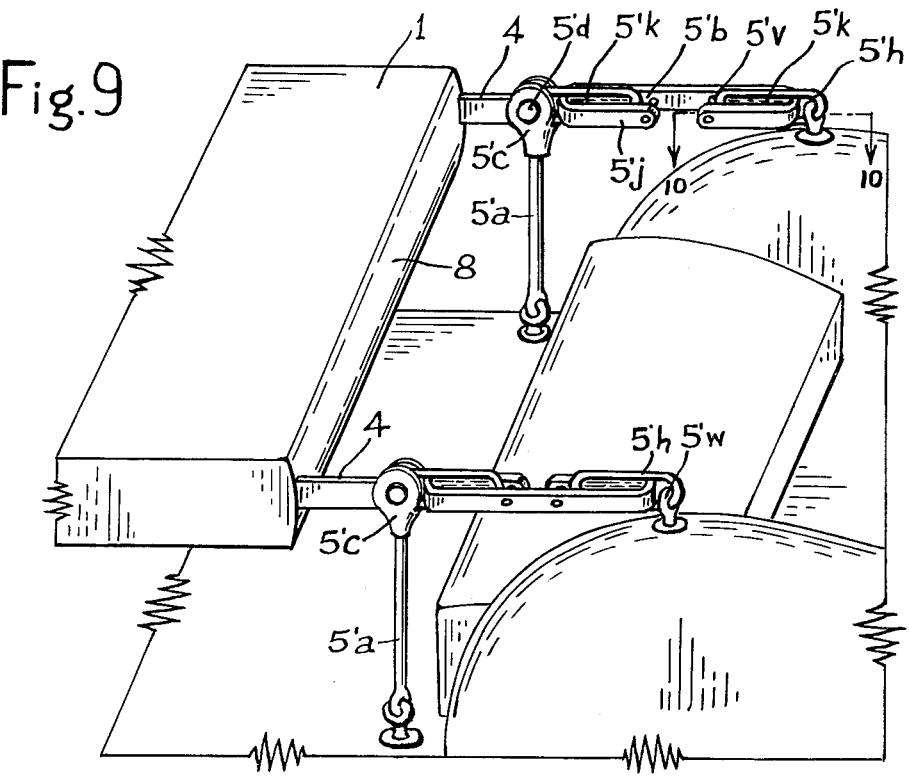
FIG. 9 shows another variant of extensible rear load resisting links with the tray of FIGS. 1 and 6.
Figure 10:
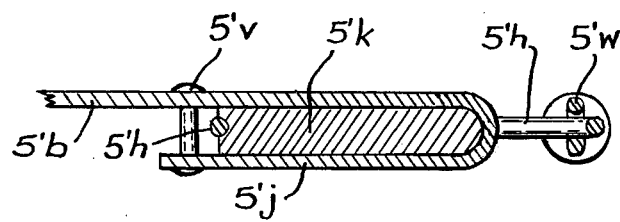
FIG. 10 shows a section through a one-shot deformable structure incorporated into rear links of FIG. 9.

Referring first to FIG. 1, tray 1, which may have the inner structure shown in FIG. 6, has a pair of bent rods 2 journalled in sleeves 3 attached at the front edge of the tray, while the rear corners of the tray may be attached by means of the protruding ends of frame strap 4 to at least one of the rear link members 5, as shown in FIG. 1, or to two links as shown in FIG. 9, in which are shown substantially horizontal strut 5'b and a substantially vertical strut 5'a. Clevises 5d are shown in detail in FIG. 2 to suggest a possible design of clevis pin 5d spring loaded into engaged position by spring 5e bearing against washer 5f, which also ensures that the pin will always be handy for attachment of the clevis. Bent rods 2 comprise a straight section 2a journalled in sleeves 3 attached to the front edge of the tray, a section 2b at right angles to section 2a and a further section 2c at right angles to section 2b and co-planar with sections 2a and 2b and bearing on the top surface of tray 1 when in operable position as shown, a section 2d at right angles to section 2a and angled downwardly from the plane of the top of the tray as shown, and section 2e right angled outwardly from section 2d to engage the openings in vertical square box members 6 as shown in detail in FIG. 3. These box members 6 are secured to the door posts 30 or to other convenient locations in the vehicle walls by means of screws, in holes, 6f. A further half loop 2f may be added at the end of section 2c to serve as a handle, but may be omitted, since it is quite practical to grasp the tray itself for manipulation. Extensions 2b and 2c may be sheathed and thickened by padding to prevent it causing injury.

Referring to FIG. 3, a slot 6a runs vertically substantially the entire length of box member 6, of the front mounting means. Communicating with this slot are openings 6b and 6c which form downwardly directed L shaped recesses in the inwardly facing surfaces of the box members. As shown further in FIG. 4, a single recess 6'b may be provided for an adult position, a forwardly angled extension 6'd of slot 6'a leading to a child's position, and a circular opening 6'e may be added for insertion of rod section 2e if it is desired to have an enlarged end for added security. The uppermost extremity 6'g of slot 6'a is provided for lifting the tray clear of the knees of passengers in order to store the tray in a hanging vertical position (not shown) with the rear edge lowered to the floor and the rods still engaged in their slots. For storage, of course, the mounts 5 of FIG. 1 are released at their clevises and dropped to the floor out of the way but readily available. The rear mount 4'b of FIG. 4 is simply slid into channel 4'a after being released from mounting lug 7, and becomes part of the stored tray. FIG. 5 shows how slot 4'h in bar 4'b is engaged with lug 7 and sleeve 4'e is slid down over the connection. In a collision bar 4'b is put in tension, and there will be a tendency for hook end 4'g to straighten out. This is prevented by sleeve 4'e which envelops the end of bar 4'b forming a strong assembly. The above rear anchorage means prevents any possibility of the rear links of the tray being detached. A weak or insecure rear edge tray anchorage may permit the rear part of the tray to swing upwards, throwing upwards the passangers behind it, and thus further aggravating the safety problem.

Figure 8:
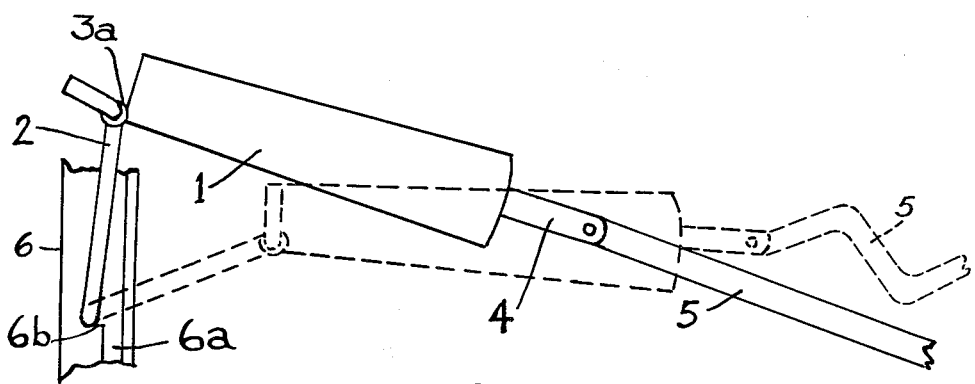
FIG. 8 shows the action of a tray under a collision impact.

In many collisions, car occupants are thrown not only forwards but also upward, and so it is desirable to incorporate an alignment means into the crushable tray arrangement, so that the tray tilts increasingly upwards as increasing impact forces continue to act on it. In FIG. 8 front rod 2 is shown journalled in a sleeve 3a attached to the bottom edge of the front of the tray, as in FIG. 4, a variant which leaves the top surface of the tray clear. In either variant, forward travel of the tray due to yielding of the deformable structure in the rear links under shock will result in rotation of rod 2 about its seat in recess 6b (or 6c as the case may be), and the front of the tray will be raised as shown, the tray progressing from its usual position, shown in dotted lines, to the solid line position. This action tilts the tray into partial alignment with the expected vertical component of collision forces.

Three variants of rear mounts are disclosed, although many equivalents will occur to one skilled in the art. The rear link or rod 5 of FIG. 1 is designed to yield in two ways under tension, by straightening out the undulations in the rod and by crushing of soft sleeve 5g, which may be of porous lead or other deformable material. Horizontal strut 5'b shown in FIG. 9 is attached at either or both ends by closed links 5'h fitted in U sections 5'j of bar 5'b as shown, with deformable material 5'k filling the space enclosed by the U section 5'j. Under tension links 5'h cut through the deformable material under sharp impact allowing the tray to be driven forward. Vertical strut 5'a merely turns about its pivotal attachment to the floor (not shown), but it also resists upward displacement of the rear edge of the tray. In the variant shown in FIGS. 4, 5, and 7, bar 4'b is a sliding fit in channel 4'a, which is fixed to beam member 4'f, as described later, channel 4'a being an integral part of the tray. A rivet 4'c which may have a wedge shaped cross section as shown in dotted line in FIG. 4, travels in a slot 4'b in the channel, which permits bar 4'b to be stowed away in the tray after detaching from rear anchorage lugs, 7. The rear section of the slot is filled with a volume of solid deformable material 4'k, so that a shock load will cause the tray and its channel 4'a to be driven forward against the resistance of the wedge-shaped rivet cutting through the deformable material 4'k in the slot 4'd, until the rivet reaches the end of the slot 4'p. In all cases, as the tray is driven forward, the action is as shown in FIG. 8, and the tray is tilted upwards at the front out of the horizontal plane.

Since it is impossible to predict exactly the angle of the impact force, which will vary for different accident or collision conditions, the tray 1 must be reinforced vertically, so that the crushable material will not be pushed out of line instead of compressing fully, either until it has all been crushed or until all the energy of deceleration has been used.

In the variant of FIGS. 1 and 6, a hardwood beam 1b extends across the front edge of the tray and balsa blocks of varying section, 1c, 1d, 1e, and 1g, and tying struts 1f and 1h form the rest of the internal structure as shown in FIG. 6. Bar 4 is wrapped around the tray on three sides, and at least one pair of twisted wires 1j span the tray from one side of bar 4 to the other, passing through holes in blocks 1h. The whole tray is sheathed with aluminum sheet 1a, or other suitable material strong enough to help to contain the crushing balsa members and tying struts but not so strong as to interfere substantially with said crushing. Wires 1j may be of aluminum also, so that they will stretch under load, and will co-operate with sheath 1a to keep the balsa wood members and struts 1f from being deflected too far out of their plane. The reason for the varying cross sections of the balsa members is to provide some members that will crush more readily and cushion, for example, one child in a minor accident, and others that will only crush if struck by several adults in a head-on collision. The exact design of these members is obviously variable; for example, the balsa sections may be weakened by drilled holes. A pad of soft material 8 may be cemented to the rear edge of the tray, both for comfort and to protect clothes which might be soiled by the aluminum sheet 1a.

Figure 7:
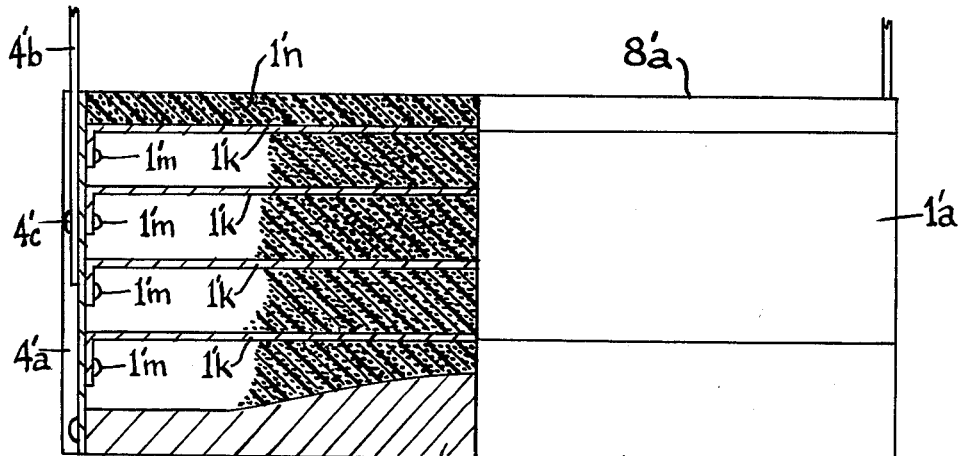
FIG. 7 is a top plan view of the tray shown in FIG. 4, with the rear edge uppermost and with a plane section slicing through the left hand half of the tray and exposing to view the inner structure of the type shown mounted in FIG. 4.

In the preferred variant of crushable tray shown in FIGS. 4 and 7, beam section 4'f can be of cast aluminum or other suitable material, and is proportioned as shown to withstand deflection. It may also include side extensions to reinforce the attached channels 4a if desired. A stronger construction could also be achieved by forming channel 4'a like bar 4 in FIG. 6 and encircling the tray at the front. Curved sheets of aluminum or other suitable material 1'k are riveted to channel 4'a as shown in FIG. 7, by rivets 1'm at a distance from their corner bends so that they are able to collapse towards the front beam 4'f by pulling away from the channels without immediately tearing loose from their rivets. In this way a progressive crushing of the tray results in collapse of one curved sheet at a time, with the remaining sheets maintaining the strength of the tray in a vertical direction. It will be realized that because of their depth and curved section, sheets 1'k will have considerable strength in the vertical direction, enhanced by bonding them to the crushable material of the tray. At the same time they will not appreciably interfere with the crushing of the tray. The crushable material 1'n may be hexagonal cellular aluminum, foamed plastic, or other suitable material which will crush and absorb energy without rebound. As in the balsa wood variant, the sections of crushable material may be varied in strength, the likeliest way being to use the weakest material for edge 8'a, the sections becoming stronger towards the beam 4'f, the section immediately adjacent to the beam being crushable only by the most violent shock for which the tray is designed. As in the previous variant, the whole tray may be sheathed in aluminum sheet 1'a bonded to inner tray components, with the exception of section 8'a immediately adjacent to the passengers.

It will be noted that, while the tray is already angled somewhat before any yielding of supports, its design allows a top section 1'p to be provided that is substantially level for games or refreshments, and an upwardly angled section 1'q may be found more suitable for resting a book or other reading matter. Upon collapse of the deformable material in the rear mounts, resulting in the action shown in FIG. 8, the tray takes a more pronounced tilt, the better to align itself with the possible vertical forces produced in a collision.

The advantage of the present invention over seat belts and previous designs of safety tray are obvious. A very securely anchored safety barrier is provided, which also provides a very substantial amount of yielding under violent impact conditions. This device also serves as a utility tray for children as well as for adults. Many variants are possible while adhering to the basic principles of the invention as defined in the following claims.

What is claimed is:
1. A combined safety device and utility tray for vehicles having a seat structure for passengers comprising
   (a) a rigid front beam positioned ahead of and parallel to said seat structure, and
   (b) a pair of links connecting said beam rearwardly of said beam to anchoring lugs firmly attached to said vehicle, and
   (c) crushable material mounted between said links and abutting said beam and extending to rear of said beam so as to form a flat tray with said beam, said tray being bounded by substantially flat top and bottom surfaces, said crushable material and said beam having their greatest cross-sectional dimensions lying substantially parallel to said surfaces, and
   (d) mounting means extending outwardly and upwardly from opposite ends of said beam and connecting said beam pivotally to said vehicle enabling the rear of said tray to be positioned adjacent to the bodies of said passengers whereby sudden deceleration of said vehicle from a high forward speed will cause said crushable material to be crushed between said passengers and said beam, thereby absorbing a substantial portion of impact energy and decelerating said passengers at a controlled rate through a substantial distance.

2. A device as defined in claim 1 wherein said crushable material is traversed from side to side by strips of sheet material perpendicular to the top surface of said tray, thereby reinforcing said crushable material against loads encountered in the use of said utility tray and also against deceleration force components normal to the said tray, without, to any appreciable extent, interfering with the crushing of said crushable material during a deceleration of said vehicle passengers under vehicle crash conditions.

3. A device as defined in claim 2 comprising a tough skin enclosing said crushable material, said strips of sheet material being adhered to said skin for mutual support.

4. A device as defined in claim 1 wherein said pair of links comprise front and rear sections connected by readily detachable joints, whereby said beam, said pair of front link sections, and said crushable material may be pivoted downward and forward to a position of storage, and said pair of rear link sections may drop to a position of storage while still remaining attached to said anchoring lugs.

5. A device as claimed in claim 4, wherein said pair of rear link sections comprise interlocking reverse bends confining volumes of malleable material, whereby further energy of deceleration over and above that absorbed by said crushing of said crushable material may be absorbed by the displacement of the interlocking reverse bends through the malleable material.

6. A device as defined in claim 1, wherein said pair of links comprise front and rear sections slidably engaged with each other and said rear sections are readily detachable from said anchoring lugs, whereby said pair of rear link sections may be detached from said lugs and slid forward, and the entire assembly of said beam, said pair of links, and said crushable material may be pivoted downward and forward to a position of storage.

7. A device as defined in claim 6, wherein said front and rear sections are freely extendable to a combined length enabling said rear sections to be attached to said anchoring lugs, and further extension of said sections is resisted by the abutment of a pair of pins in one pair of said sections with a volume of solid malleable material in the other pair of said sections, whereby further deceleration energy over and above that absorbed by said crushing of said crushable material may be absorbed by the displacement of said pins through said malleable material.

8. A device as defined in claim 6, wherein said rear sections comprise hooked ends engageable with said anchoring lugs, and sleeves slidable over said hooks, thereby locking said hooks onto said lugs and also reinforcing said hooks against opening by deceleration forces.

9. A device as defined in claim 1, comprising a tough skin enclosing said crushable material, said tough skin being secured to edges of said beam adjacent said crushable material.

10. A device as defined in claim 1, wherein said crushable material includes rows of laterally spaced individual blocks, whereby the effective compressive strength of said tray is less than that of a solid tray of the crushable material of which said individual blocks are comprised.

11. A device as defined in claim 10, wherein the material of said individual blocks is balsa wood.

12. A device as defined in claim 10 comprising a tough skin enclosing said crushable material, said individual blocks being adhered to said skin.

13. A device as defined in claim 10, wherein said crushable material includes a beam parallel to said rigid front beam and interposed between two of said rows of laterally spaced individual blocks.

14. A device as defined in claim 1, wherein said crushable material includes a beam positioned parallel to and spaced from said rigid front beam.

References Cited by the Examiner

UNITED STATES PATENTS

| | | | |
|---|---|---|---|
| 1,807,525 | 5/31 | Gould | 296—85 |
| 2,322,755 | 6/43 | Voohies | 280—150 |
| 2,749,143 | 6/56 | Chika | 280—150 |
| 2,750,203 | 6/56 | Biehler | 280—150 |
| 2,833,554 | 5/58 | Ricordi | 280—150 |
| 2,923,558 | 2/60 | Goenewegen | 280—150 |
| 2,977,135 | 3/61 | Graham | 280—150 |
| 3,003,786 | 10/61 | Liston | 280—150 |

FOREIGN PATENTS 1,065,793  1/54  France.

BENJAMIN HERSH, *Primary Examiner.*

LEO FRIAGLIA, KENNETH H. BETTS, A. HARRY LEVY, *Examiners.*